United States Patent
Shimizu et al.

(10) Patent No.: US 9,178,691 B2
(45) Date of Patent: Nov. 3, 2015

(54) APPARATUS FOR CORRECTING SIGNAL, TRANSMISSION APPARATUS, METHOD OF CORRECTING SIGNAL, AND TRANSMISSION SYSTEM

(71) Applicant: FUJITSU LIMITED, Kawasaki-shi, Kanagawa (JP)

(72) Inventors: Takashi Shimizu, Kawasaki (JP); Jun Matsui, Kawasaki (JP); Tsuyoshi Yamamoto, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/153,169

(22) Filed: Jan. 13, 2014

(65) Prior Publication Data

US 2014/0269844 A1 Sep. 18, 2014

(30) Foreign Application Priority Data

Mar. 18, 2013 (JP) .................................. 2013-054527

(51) Int. Cl.
| | |
|---|---|
| *H04L 7/04* | (2006.01) |
| *H04B 1/7073* | (2011.01) |
| *G06F 13/40* | (2006.01) |
| *H04L 7/00* | (2006.01) |
| *H04B 15/04* | (2006.01) |

(52) U.S. Cl.
CPC *H04L 7/04* (2013.01); *G06F 13/40* (2013.01); *H04B 1/7073* (2013.01); *H04L 7/0008* (2013.01); *H04B 15/04* (2013.01)

(58) Field of Classification Search
USPC .................................. 375/130, 135, 136, 145
See application file for complete search history.

(56) References Cited

U.S. PATENT DOCUMENTS

| 7,839,916 | B1 * | 11/2010 | Luecke et al. ................. 375/147 |
| 2007/0021122 | A1 * | 1/2007 | Lane et al. ..................... 455/441 |
| 2008/0172195 | A1 | 7/2008 | Nakadaira |
| 2008/0253493 | A1 | 10/2008 | Aoyama |
| 2008/0253494 | A1 | 10/2008 | Aoyama |
| 2010/0027586 | A1 | 2/2010 | Ogasawara et al. |
| 2011/0225341 | A1 | 9/2011 | Satoh et al. |

FOREIGN PATENT DOCUMENTS

| JP | 2006-155581 | 6/2006 |
| JP | 2008-175646 | 7/2008 |
| JP | 2008-263508 | 10/2008 |
| JP | 2008-263509 | 10/2008 |
| JP | 2010-35015 | 2/2010 |
| JP | 2010-283830 | 12/2010 |
| JP | 2012-128717 | 7/2012 |

OTHER PUBLICATIONS

PCI Express® OCuLink Specification Revision 0.5, Aug. 24, 2012, pp. 1-51.

* cited by examiner

*Primary Examiner* — Kabir A Timory
(74) *Attorney, Agent, or Firm* — Fujitsu Patent Center

(57) ABSTRACT

An apparatus for correcting a signal, includes a correction value calculator that determines a transmission distance of a transmission path through which a timing signal is propagated, the timing signal having a periodically changing frequency, and determines a deviation between a frequency of the timing signal and a frequency of received data, as a correction value, from the transmission distance; and a corrector that corrects the frequency of the timing signal by the correction value for synchronizing transmitted data with the timing signal.

4 Claims, 9 Drawing Sheets

| TRANSMISSION DISTANCE(m) | 0 | 5 | 10 | 20 | 30 | 40 | 50 |
|---|---|---|---|---|---|---|---|
| OPTICAL TRANSMISSION (ps) | 50 | 52 | 54 | 56 | 58 | 60 | 62 |
| ELECTRIC TRANSMISSION (ps) | 30 | 35 | 40 | 45 | 50 | 55 | 60 |

APPARATUS FOR CORRECTING SIGNAL, TRANSMISSION APPARATUS, METHOD OF CORRECTING SIGNAL, AND TRANSMISSION SYSTEM

CROSS-REFERENCE TO RELATED APPLICATION

This application is based upon and claims the benefit of priority of the prior Japanese Patent Application No. 2013-054527, filed on Mar. 18, 2013, the entire contents of which are incorporated herein by reference.

FIELD

The present disclosure relates to an apparatus for correcting a signal, a transmission apparatus, a method of correcting a signal, and a transmission system.

BACKGROUND

Communication schemes have been well-known where clock signals (clocks), as well as data signals, are transmitted between transmitting and receiving devices.

One such example is the PCI Express® wherein clocks are transmitted in the side band upon transmitting bus signals in servers, personal computers (PCs), or devices. (As for the PCI Express®, refer to PCI express OCuLink Specification Rev 0.5).

The PCI Express® is one communication standard for performing communications via a pair of transmitting and receiving paths for serial transmissions (such paths are referred to as lanes).

The maximum speed of a single lane is 8 gigabytes (GB) per second (GB/s), and 32 lanes can be bundled at maximum. The bundle of the transmission paths are collectively referred to as a link.

A typical PCI Express® system includes a root complex, an end point, a switch, and a bridge.

The root complex is a device located at the bottom of the hierarchy, and includes a host bridge and is connected to a CPU, a memory, and the like.

In PCI Express®, an input/output (I/O) device is referred to as an end point.

In the meantime, the recent increase in data communication speeds has underlined the influences of the noises caused by electro magnetic interferences (EMIs).

For addressing such EMI noises, an increasing number of systems and/or architecture have adopted clocks having periodically varying frequencies, as standard clock, such as spread spectrum clocks (SSCs), as their standard clocks. SSCs are clocks where the bandwidth is spread by sweeping the clock frequency.

SSCs intentionally fluctuate the frequency of the clocks, thereby preventing energy to be concentrated on a particular frequency, which may cause EMIs to reduce noises.

FIG. 8 is a graph illustrating an SSC waveform used in a transmission system. This SSC represents a down spread wherein a triangular wave having a modulation frequency of 30 kHz, as specified in PCI Express®, is modulated only to the lower-frequency side, with a frequency of 100 MHz and a modulation index of 0.5%, for example.

As depicted in FIG. 8, since SSCs have frequencies that vary over time, the signal intensity for each frequency is reduced, which reduces the influences of EMIs.

In the meantime, demands for long-haul data transmissions have increased in recent years. For example, for interconnections between server racks, e.g., Internet data centers (iDCs) and centralized management of devices, inter-enclosure connections among peripheral devices, CPUs, and memory blades, located in separate enclosures, are increased. Furthermore, a desire to transmitting massive data to monitors at higher speed is increased in commercial PCs.

With a significant increase in the transmission distances, deviations between the changing frequency of SSCs and the frequency of received data have become problematic.

To address such deviations, techniques are proposed for minimizing the diffusion coefficient of SSCs. For example, there are techniques that minimize the diffusion coefficient of SSCs by checking the status of devices that are connected.

There is, however, a tradeoff between the diffusion coefficient and the transmission delay time. Hence, in systems where sufficient diffusion coefficients are required for SSCs, the SSCs cannot be transmitted in a longer distance.

FIG. 9 is a schematic diagram illustrating a configuration of a conventional data transmission system, and FIG. 9B a graph illustrating an SSC waveform used in the data transmission system 1 in FIG. 9A.

The data transmission system 1 uses signals having periodically changing frequencies (e.g., SSCs), as clocks.

The data transmission system 1 communicates data, in accordance with any suitable communication standard, such as the PCI Express®, for example. As depicted in FIG. 9A, the data transmission system 1 includes an upstream port 11, a downstream port 21, and an optical fiber 30.

The upstream port 11 may be a root complex of the PCI Express®, for example, which may be provided on a mother board of a server, for example. The upstream port 11 includes a reference oscillator 12.

The optical fiber 30 is a bundle of optical fiber cables, and includes a clock transmission path, a downstream data transmission path, and an upstream data transmission path.

The downstream port 21 may be an end point of the PCI Express®, for example, and may be provided in any suitable peripheral devices, such as hard disk drives, for example. The downstream port 21 includes a phase locked loop (PLL) 22.

Here, the clock is expressed in F(x) in FIG. 9B. The frequency of a clock, which is used for data generation by the upstream port 11 at Time t is expressed by F(t) and is indicated with the arrow in the double dashed line.

For t which is the time required for a signal to be transmitted from the upstream port 11 to the downstream port 21, the reference when the data is received in the upstream port 11 corresponds to the clock at the time when the data was generated in the downstream port 21, and the clock has been transmitted from the upstream port 11. In other words, the clock is the clock before 2T, and the frequency at that time is expressed in (t−2T) and is indicated with the arrow in the single dashed line FIG. 9A.

Therefore, in the upstream port 11, data generated using the clock with the 2T-old frequency F(t−2T) is strobed using the latest clock F(t).

In this manner, upon sending SSCs having a frequency which varies over time, occurrence of any transmission delay during transmission changes the frequency of the clock, thereby inducing the difference (deviation) in frequencies between the clock and a data signal. The greater the delay, the greater the frequency difference becomes, which is problematic for long-haul transmissions.

Specifically, if there is a difference between the reference clock of data and a clock used for strobing, the strobe point of the data may gradually deviate, which hinders the data from being received correctly.

For the above reason, in PCI Express® requires that the difference be within several hundred pars per million (ppm), for example.

In conventional configurations where hard disk drives are directly connected to a server, the difference in frequencies does not cause any problem since the transmission distance is small and hence τ is negligible.

As set forth above, although demands for long-haul transmissions of SSCs become intense, an increased transmission delay hinders the SSCs from being transmitted for a longer distance.

In one aspect, the present disclosure is directed to enabling transmissions of timing signals having periodically varying frequencies in a longer distance.

Note that it is another object of the present embodiment to provide advantages and effects that can be obtained by the best modes to implement the embodiment described below but cannot be obtained with conventional techniques.

SUMMARY

Accordingly, an apparatus for correcting a signal, includes a correction value calculator that determines a transmission distance of a transmission path through which a timing signal is propagated, the timing signal having a periodically changing frequency, and determines a deviation between a frequency of the timing signal and a frequency of received data, as a correction value, from the transmission distance; and a corrector that corrects the frequency of the timing signal by the correction value for synchronizing transmitted data with the timing signal.

Further, a transmission apparatus includes a correction value calculator that determines a transmission distance of a transmission path through which a timing signal is propagated, the timing signal having a periodically changing frequency, and determines a deviation between a frequency of the timing signal and a frequency of received data, as a correction value, from the transmission distance; a corrector that corrects the frequency of the timing signal by the correction value for synchronizing transmitted data with the timing signal; a generator that generates the transmitted data using the timing signal that is corrected by the correction value; and a transmitter that sends the transmitted data to the transmission path.

Furthermore, a method of correcting a signal, includes determining a transmission distance of a transmission path through which a timing signal is propagated, the timing signal having a periodically changing frequency; determining a deviation between a frequency of the timing signal and a frequency of received data, as a correction value, from the transmission distance; and correcting the frequency of the timing signal by the correction value for synchronizing transmitted data with the timing signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a transmission distance conversion table in a clock corrector as one example of an embodiment;

DESCRIPTION OF EMBODIMENTS (A) Embodiment

Hereunder is a description of an embodiment in accordance with the disclosed technique with reference to the drawings.

Figure 1:
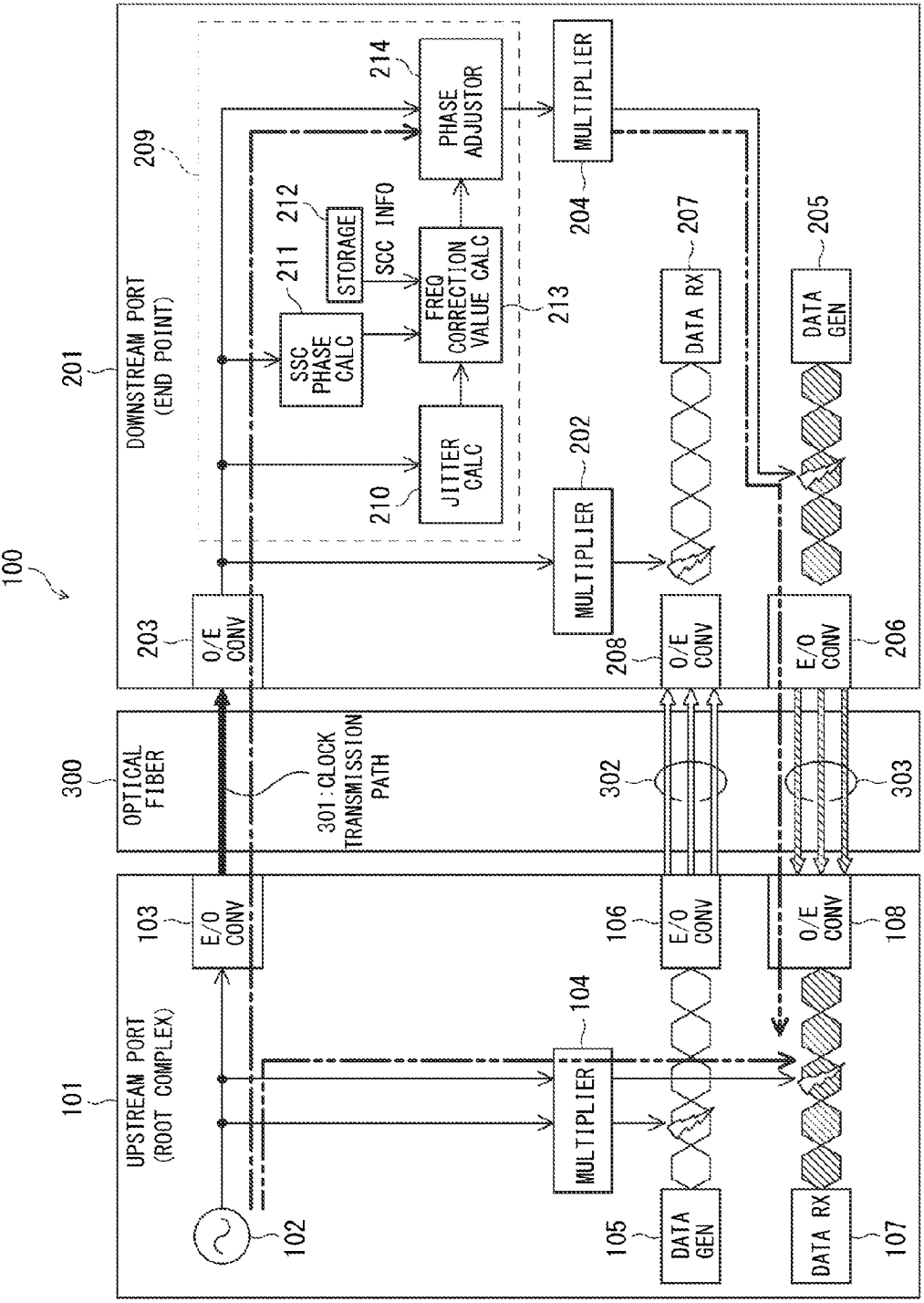
FIG. 1 is a schematic diagram illustrating a configuration of a data transmission system as one example of an embodiment.

FIG. 1 is a schematic diagram illustrating a configuration of a data transmission system 100 as one example of an embodiment.

The data transmission system 100 uses signals having periodically changing frequencies (e.g., SSCs), as clocks. The data transmission system 100 determines the magnitude of a delay of a clock (SSC) based on a jitter of that clock induced during the transmission of the clock, and corrects the clock strobing with a received data by means of the deviation of the frequency that is equivalent to the delay.

The data transmission system 100 communicates data, in accordance with any suitable communication standard, such as the PCI Express®, for example. The data transmission system 100 includes an upstream port (first device) 101, a downstream port (second device) 201, and an optical fiber (transmission path) 300.

The upstream port 101 may be a root complex of the PCI Express®, for example, which may be provided on a mother board of a server, for example. The upstream port 101 includes a reference oscillator (timing signal generator) 102, electrical/optical (E/O) converter (transmitter) 103, a multiplier 104, a data generator 105, an E/O converter 106, a data receiver 107, and an optical/electrical (O/E) converter 108.

The reference oscillator 102 supplies clocks used in the data transmission system 100. The reference oscillator 102 may generate 100-MHz SSCs, for example.

The E/O converter 103 converts the clocks generated by the reference oscillator 102 into optical signals, and sends the converted signals to the downstream port 201 through a downstream data signal transmission path 302 (described later).

The multiplier 104 multiplies the clocks generated by the reference oscillator. For example, the multiplier 104 multiplies the clocks by 80 times to generate 8-GHz clocks.

The data generator 105 outputs data signals in sync with the clocks multiplied by the multiplier 104. For example, the data generator 105 outputs 8-GHz data signal in sync with multiplied clocks which are obtained by multiplying the clocks by 80 times.

The E/O converter 106 converts the data signals generated by the data generator 105 into optical signals, and optically transmits the converted signals to the downstream port 201 through a downstream data transmission path 302 (described later).

The O/E converter 108 receives, through an upstream data transmission path 303 (described later), the optical data signals that are optically transmitted from the downstream port 201, and converts the received signals to electric signals.

The data receiver 107 receives the electric signals converted by the O/E converter 108 by strobing in sync with clocks from the reference oscillator 102.

The optical fiber 300 is a bundle of optical fiber cables, and includes a clock transmission path 301, a downstream data transmission path 302, and an upstream data transmission path 303.

Among transmission paths connecting the upstream port 101 and the downstream port 201, the clock transmission path 301 is a clock transmission path for optically transmitting clocks generated by the reference oscillator 102 from the upstream port 101 to the downstream port 201.

The downstream data transmission path 302 is a data transmission path for optically transmitting data signals from the upstream port 101 to the downstream port 201.

The upstream data transmission path 303 is a data transmission path for optically transmitting data signals from the downstream port 201 to the upstream port 101.

Although the data transmission system 100 performs optical transmissions through the optical fiber 300 in the present embodiment, the data transmission system 100 may perform optical transmissions and/or electric transmissions. Hence, hereinafter, the optical fiber 300 may be simply referred to as the transmission path 300.

The downstream port 201 may be an end point of the PCI Express®, for example, and may be provided in any suitable peripheral devices, such as hard disk drives, for example. The downstream port 201 includes a multiplier 202, an O/E converter 203, a multiplier 204, a data generator 205, an E/O converter (transmitter, second transmitter) 206, a data receiver 207, an O/E converter 208, and a clock corrector (transmission apparatus) 209.

The O/E converter 203 receives clocks that are sent from the upstream port 101 through the clock transmission path 301 in the form of optical signals, and converts the received signals into electric signals.

The multiplier 202 multiplies the clocks that are received by the O/E converter 203 from the upstream port 101. In other words, the multiplier 202 multiplies uncorrected clocks, i.e., clocks which have not undergone frequency correction by the clock corrector 209 (described later). For example, the multiplier 202 multiplies uncorrected clocks by 80 times to generate 8-GHz clocks.

The O/E converter 208 receives, through a downstream data transmission path 303, the optical data signals that are optically transmitted from the upstream port 101, and converts the received signals to electric signals.

The data receiver 207 receives the electric signals converted by the O/E converter 208 by strobing in sync with the clocks multiplied by multiplier 202.

The clock corrector 209 corrects clocks sent from the upstream port 101 through the clock transmission path 301 to generate corrected clocks. The corrected clocks are used for outputting data signals to be sent to the upstream port 101 through the upstream data transmission path 303.

The clock corrector 209 includes a jitter calculator (jitter calculator) 210, an SSC phase calculator (phase calculator) 211, a storage 212, a frequency correction value calculator (correction value calculator) 213, and a phase adjustor (corrector) 214

The jitter calculator 210 receives the clocks sent from the upstream port 101, from the O/E converter 203, measures jitters in the clocks, and outputs the jitters to a frequency correction value calculator 213 (described later), as analog signals. The jitter calculator 210 may be embodied as an analog circuit, for example. The detailed configuration of the jitter calculator 210 will be described with reference to FIG. 4.

The SSC phase calculator 211 determines the phase of the modulation cycle from the frequency of and rate of change in the clocks sent from the upstream port 101. The SSC phase calculator 211 notifies a frequency correction value calculator 213 (described later) of information of the correction frequency. In other words, the SSC phase calculator 211 determines where an input clock locates in the phase of the variation in the SSC. The SSC phase calculator 211 may be embodied as an analog circuit, for example. The detailed configuration of the SSC phase calculator 211 will be described with reference to FIG. 5.

The storage 212 stores SSC information 216 (refer to FIG. 3) which is fundamental information of SSCs used for calculation by the frequency correction value calculator 213 (described later). The SSC information 216 includes the modulation frequency, modulation index, modulation waveform, and the like, of the SSCs, for example. The SSC information 216 varies depending on the communication standards adopted in the data transmission system 100, for example, and corresponding SSC information 216 is stored in the storage 212 for each communication standard to be employed in the data transmission system 100.

The storage 212 stores the correlation between the jitter and the transmission distance L, in a table (transmission distance conversion table 215) or relation expression.

FIG. 2 is a diagram illustrating a transmission distance conversion table 215 in the clock corrector 209 as one example of an embodiment.

As depicted in FIG. 2, the transmission distance conversion table 215 stores jitters (in pico seconds (psec)) during an optical transmission and jitters (in psec) during an electric transmission, in certain transmission distances L.

The storage 212 may be embodied as a memory (not illustrated), for example.

The frequency correction value calculator 213 in illustrated in FIG. 1 obtains the transmission distance L or transmission time from the jitter determined by the jitter calculator 210, by looking up the transmission distance conversion table 215.

Once the transmission distance L is determined, the frequency correction value calculator 213 determines the transmission delay time from the refractive index of the optical fiber 300 and speed of light, as will be set forth below.

The frequency correction value calculator 213 estimates the clock frequency of the reference oscillator 102 at the time when a data signal is received at the upstream port 101, based on the phase of an SSC and the modulation information, and outputs a signal to shift the clock frequency for synchronization. The frequency correction value calculator 213 outputs the signal to the phase adjustor 214 in the latter stage as an analog signal, for example.

Here, the frequency correction value calculator 213 estimates the time T which is the time duration during which a clock propagates on the clock transmission path 301. Generally, it takes 2T for a roundtrip of a clock; namely, its generation by the reference oscillator 102, propagation through the clock transmission path 301, arrival at the downstream port 201, generation of a data signal, propagation of the data signal through the upstream data transmission path 303 to return to the upstream port 101.

In other words, the frequency correction value calculator 213 calculates the delay $2_T$ related to the propagation, estimates the frequency after $2_T$ of the clock (SSC) that is currently received, and outputs the difference between the clock frequency and the estimated frequency as correction value (correction magnitude.

The frequency correction value calculator 213 may be embodied as a micro processing unit (MPU) (not illustrated), for example.

The phase adjustor 214 corrects the frequency of a clock sent from the upstream port 101 through the clock transmission path 301. The phase adjustor 214 corrects a clock by applying the correction value determined by the frequency correction value calculator 213 to the clock such that the clock and data signals are synchronized in the upstream port 101.

In the present embodiment, the phase adjustor 214 corrects a clock multiplied by the multiplier 204.

The phase adjustor 214 may be embodied by means of any of well-known phase shifters, for example.

The multiplier 204 multiplies the clocks corrected by the clock corrector 209.

The data generator 205 outputs data signals in sync with the clocks multiplied by the multiplier 204. For example, the data generator 205 outputs 8-GHz data signal in sync with multiplied clocks which are obtained by multiplying the clocks by 80 times.

The E/O converter 206 converts data signals generated by the data generator 205 into optical signals, and optically transmits the converted signals to the upstream port 101.

Here, sending signals through the clock transmission path 301 and the upstream data transmission path 303 takes some time. Hence, in the absence of the clock corrector 209, if the downstream port 102 generates a data signal using a clock receive from the upstream port 101 without any correction and that data signal is strobed in the upstream port 101, a frequency difference would be generated.

In contrast, the clock corrector 209 calculates such a frequency difference to correct clocks transmitted over the clock transmission path 301, the data signal and the clock can be synchronized upon receiving the data signal in the upstream port 101.

The correction value in the clock corrector 209 is not sufficiently precise immediately after the downstream port 201 is activated, an error may occur in a data signal. However, once certain time elapses, the calculation values in the clock corrector 209 become more precise and frequency correction is correctly performed. In such a stage, no data signal error occurs.

Hereinafter, an example of frequency correction in optical transmissions compliant with the PCI Express® will be described.

In this example, the reference oscillator 102 in the upstream port 101 in FIG. 1 outputs a clock of 100 MHz.

The clock is converted into an optical signal by the E/O converter 103. The frequency of the clock at this point in time is 99.5 MHz, for example.

In the meantime, the multiplier 104 multiplies the clock by 80 times. The E/O converter 106 converts an 8-GHz data signal in sync with the multiplied clock into an optical signal, which is transmitted to the downstream port 201 through the transmission path 300. In the downstream port 201, the optical clock is converted into an electric signal by the 0/E converter 203.

At this point, the jitter varies depending on the transmission distance L. For example, if an offset of 50 psec and a jitter of 1 psec per 10 meters are added, the jitter of 50+1×(300/10)=80 psec is observed during a transmission with a transmission distance L of 300 meters.

Based on these relationships, the transmission distance L can be estimated from the observed jitter. If a jitter with 80 psec is observed for example, the transmission distance L can be estimated as 300 meters.

For the transmission distance L of 300 meters, the transmission delay time can be calculated as follows.

If the transmission path 300 is a quartz-based optical fiber, the transmission delay time can be calculated, from the refractive index of the optical fiber 300 of 1.48 and the speed of light of $3 \times 10^8$ m/s as follows:

$$300/(1.48 \times 3 \times 10^6) = 0.66 \text{ µsec} \quad (1)$$

In this example, the SSC information 216 contains a modulation frequency of 30 kHz and the modulation index of 3000 ppm (amplitude), and the modulation waveform is a triangular wave.

From the SSC information 216 described above, the deviation in the clock frequency at a transmission delay time of 0.66 µsec calculated using Eq. (1) can be determined using the following Eq. (2):

$$3000 \times 2 \times 0.66 \times 10^{-6} \times (30 \times 1000) = 120 \text{ ppm} \quad (2)$$

In this manner, a deviation of $100 \text{ MHz} \times 120 \times 10^{-6} = 12 \text{ kHz}$ is induced in the frequency of the SSC.

In the meantime, the SSC phase calculator 211 determines the frequency of the SSC currently being received in the downstream port 201 and its ratio of change. If the frequency is 99.5 MHz and the frequency is on the decline, the frequency of the reference oscillator 102 when the data signal reaches the upstream port 101 is determined as follows:

$$99.5 \text{ MHz} - 12 \text{ kHz} = 99.488 \text{ MHz} \quad (3)$$

Thus, the phase adjustor 214 shifts the phase of 99.5-MHz clock to correct to a 99.488-MHz clock. The multiplier 204 multiplies the corrected clock by 80 times. The data generator 205 generates a data signal using that ×80 multiplied clock, and the E/O converter 103 converts the data signal into an optical signal for sending it.

The signal propagates through the transmission path 300, and the O/E converter 203 in the upstream port 101 converts the transmitted signal into an electric signal. At this time by strobing using the synchronized clock, the reference oscillator 102 in the upstream port 101 oscillates the frequency at 99.488 MHz. On the other hand, since a data signal send from the downstream port 201 is in frequency sync with that data signal, the data signal can be correctly strobed.

Figure 3:
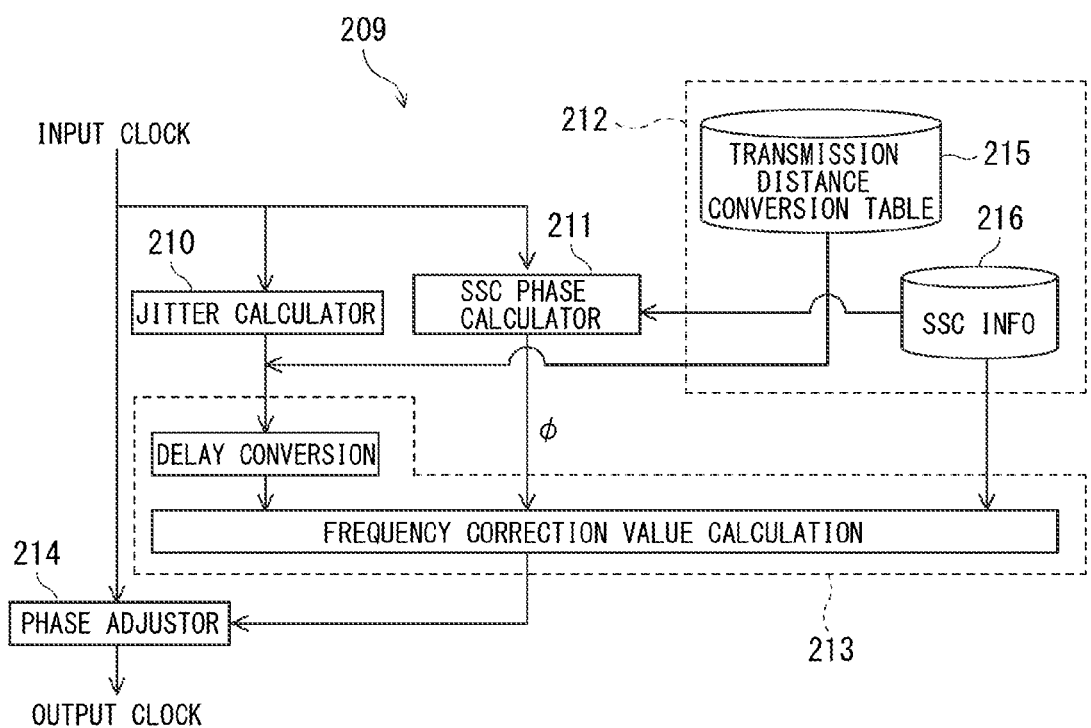
FIG. 3 is a diagram illustrating a clock processing flow in the clock corrector as one example of an embodiment.

FIG. 3 is a diagram illustrating a clock processing flow in the clock corrector 209 as one example of an embodiment.

An input clock is sent from the upstream port 101, and is then input to the phase adjustor 214, the jitter calculator 210, and the SSC phase calculator 211.

The jitter calculator 210 determines the jitter in the input clock, and outputs a jitter value. Based on the jitter value, the frequency correction value calculator 213 then looks up the transmission distance conversion table 215 to determine the delay time. The frequency correction value calculator 213 then determines a correction value based on the determined delay time, and outputs the correction value to the phase adjustor 214.

For determining jitters, the jitter calculator 210 may employ an autocorrelation function of clocks, for example.

Now, the detailed configuration of the jitter calculator 210 will be described in detail with reference to FIG. 4.

Figure 4:
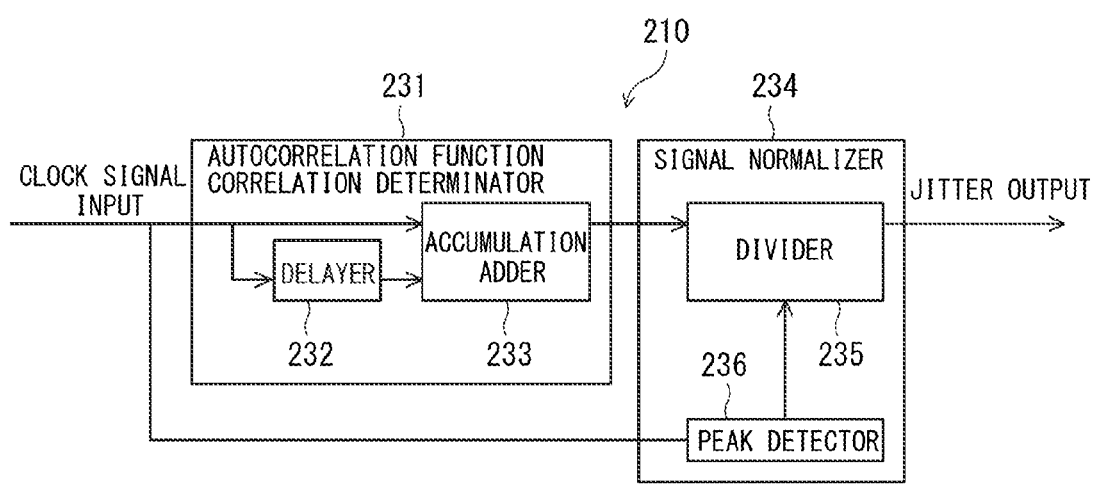
FIG. 4 is a schematic diagram illustrating a configuration of a jitter calculator as an example of an embodiment.

FIG. 4 is a schematic diagram illustrating a configuration of the jitter calculator 210 as an example of an embodiment.

The jitter calculator 210 includes an autocorrelation function correlation determinator 231 and a signal normalizer 234.

The autocorrelation function correlation determinator 231 includes a delayer 232 and an accumulation adder 233.

The delayer 232 delays a clock sent from the upstream port 101 by a predetermined delay value (e.g., one cycle), thereby introducing the certain delay into the clock.

The accumulation adder 233 calculates a particular component in the jitter by calculating the integral of the product of the input clock and the clock delayed by the delayer 232.

The signal normalizer 234 includes a divider 235 and a peak detector 236. The peak detector 236 determines the amplitude of a signal. The divider 235 eliminates any influence of the amplitude by dividing a particular component of the calculated jitter with the amplitude detected by the peak detector 236. Thereby, the divider 235 normalizes the particular component of the jitter with a signal intensity to obtain a normalized jitter. This value varies depending on the transmission distance L.

In FIG. 3, the frequency correction value calculator 213 determines the transmission distance L from the jitter determined by the jitter calculator 210, using the transmission distance conversion table 215 that indicates the relationship between the jitter and the transmission distance L, as set forth above.

The SSC phase calculator 211 determines where an input clock locates in the phase of the variation in the SSC.

Here, the detailed configuration of the SSC phase calculator 211 will be described in detail with reference to FIG. 5.

Figure 5:
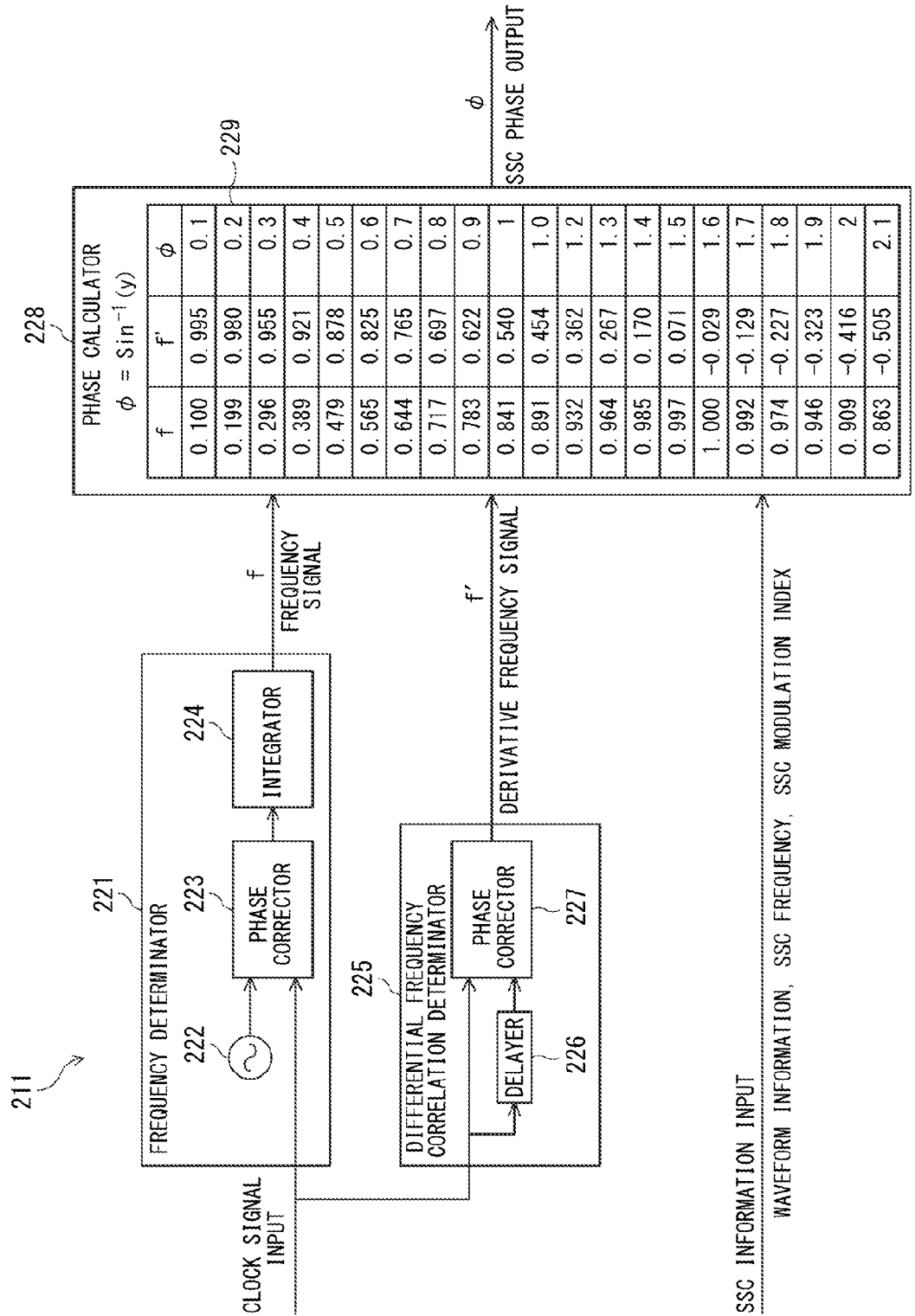
FIG. 5 is a schematic diagram illustrating a configuration of an SSC phase calculator as an example of an embodiment.

FIG. 5 is a schematic diagram illustrating a configuration of the SSC phase calculator 211 as an example of an embodiment.

The SSC phase calculator 211 includes a frequency determinator 221, a differential frequency correlation determinator 225, and a phase calculator 228.

The frequency determinator 221 compares the frequency of a clock sent from the upstream port 101 against a reference frequency. The frequency determinator 221 includes a reference signal source 222, a phase comparator 223, and an integrator 224.

The reference signal source 222 generates a reference frequency that has the same frequency as that of the clock.

The phase comparator 223 determines a frequency signal by comparing the phase of the frequency of the clock sent from the upstream port 101 against the phase of the reference frequency generated by the reference signal source 222.

The integrator 224 calculates the integral f of the comparison results by the phase comparator 223.

The differential frequency correlation determinator 225 calculates the derivative f' of the frequency of the clock sent from the upstream port 101. The differential frequency correlation determinator 225 includes a delayer 226 and a phase comparator 227.

The delayer 226 delays the clock sent from the upstream port 101 by a predetermined delay value.

The phase comparator 223 compares the frequency of the clock sent from the upstream port 101 against the phase of the delay signal delayed by the delayer 226 to determine whether the clock frequency is on the increase or on the decline.

The phase calculator 228 uniquely determines the phase φ of the clock, which is a multi-valued function, from the frequency f determined by the frequency determinator 221, and the derivative f' of the frequency determined by the differential frequency correlation determinator 225. Generally, the inverse function of a periodic function cannot be expressed by a general function. Hence, in the example depicted in FIG. 5, the phase calculator 228 looks up a phase table 229, which has been stored in the phase calculator 228 in advance, and selects an approximate value of the phase φ of the clock, form the phase table 229, for example.

The phase table 229 in this figure exemplifies the phase of a trigonometric function. The phase calculator 228 also stores tables of other phases, such as that of sawtooth wave, in advance, for example. The shape of the phase varies depending on the communication standards adopted in the data transmission system 100, for example, and a corresponding phase table 229 is stored in the phase calculator 228 for each communication standard to be employed in the data transmission system 100.

The phase calculator 228 uses the SSC information 216 to determine what type of modulation is performed with the SSC. The SSC information 216 includes various parameters that characterize the SSC, such as the waveform information, the SSC frequency, the SSC modulation index. As set forth above, the SSC information 216 varies depending on the communication standard being employed by the data transmission system 100, for example.

The SSC information 216 is used for selecting a particular phase table among phase tables 229 used by the phase calculator 228, for example.

Next, the processing flow in the clock corrector 209 will be described with reference to FIG. 6.

Figure 6:
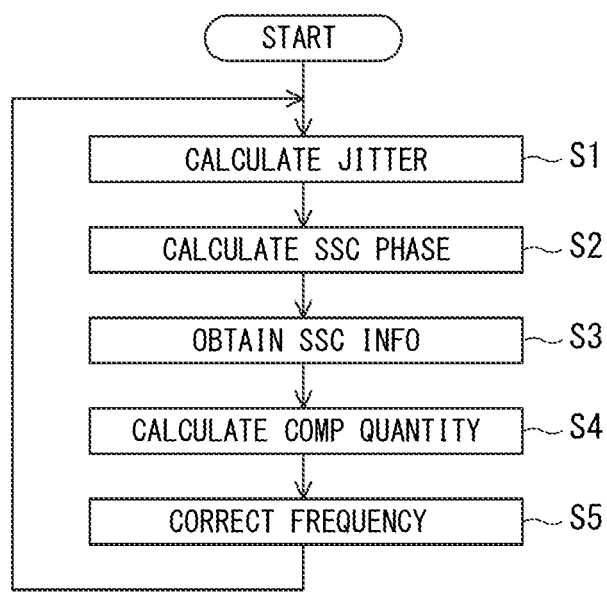
FIG. 6 is a flowchart illustrating the processing in the clock corrector as one example of an embodiment.

FIG. 6 is a flowchart illustrating the processing in the clock corrector 209 as one example of an embodiment.

In Step S 1, the jitter calculator 210 calculates the jitter in a clock sent from the upstream port 101.

Subsequently, in Step S 2, the SSC phase calculator 211 determines the SSC phase φ of the clock sent from the upstream port 101.

In Step S 3, SSC information 216 is obtained from the storage 212.

In Step S 4, the frequency correction value calculator 213 determines the frequency correction value.

Finally, in Step S 5, the phase adjustor 214 correct the frequency of the clock sent from the upstream port 101.

Thereafter, the flow returns to Step S 1.

Note that the transmission distance L is not varied during operation in current communication schemes. Once the jitter is determined, no recalculation is needed. Thus, following the processing in Step S 5, the jitter calculation in Step S 1 may be skipped and the flow may return to the SSC phase calculation in Step S 2.

Here, with reference to FIG. 1, data transmissions in the data transmission system 100 will be described.

The upstream port 101 sends a clock generated by the reference oscillator 102, through the clock transmission path 301 to the downstream port 201.

The upstream port 101 also sends a data signal (e.g., a request) to the downstream port 201 through the downstream data transmission path 303, based on the clock generated by the reference oscillator 102.

The downstream port 201 receives the clock from the upstream port 101, and receives the request sent by the upstream port 101.

The downstream port 201 outputs a data signal (e.g., response to the request) to the upstream port 101, based on the clock corrected by the clock corrector 209.

Since the data signal output from the downstream port 201 is generated using the clock frequency that is to be used by the upstream port 101 for strobing that data signal, the upstream port 101 can correctly strobe the data signal.

Note that as set forth above, an MPU (not illustrated) in the downstream port 201 functions as the frequency correction value calculator 213 by executing a program.

A program for implementing the functions as the frequency correction value calculator 213 is provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW), HD DVD, a magnetic disk, an optical disk, a magneto-optical disk, or the like. The computer then reads a program from a storage medium (not illustrated) and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer through a communication path.

Upon embodying the functions as the frequency correction value calculator 213, the program stored in an internal storage device (unillustrated memory in the downstream port 201 in this embodiment) is executed by a microprocessor of the computer (unillustrated MPU in the downstream port 201 in this embodiment). In this case, the computer may alternatively read a program stored in an unillustrated storage medium for executing it.

Note that, in this embodiment, the term "computer" may be a concept including hardware and an operating system, and may refer to hardware that operates under the control of the operating system, for example. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the downstream port 201 includes a function as a computer.

(B) Advantageous Effects

In accordance with the disclosed technique, employing a jitter in an SSC enables long-haul transmissions of the SSC over a longer distance, such as a distance of 300 meters.

Figure 7:
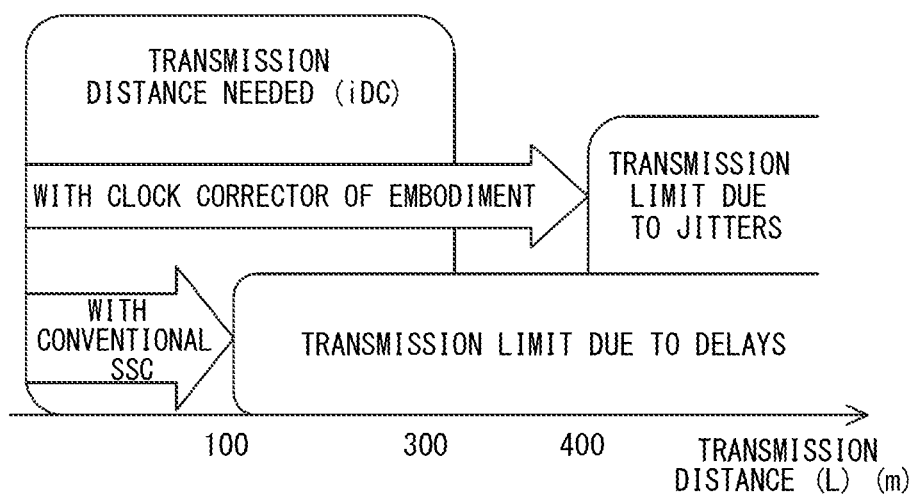
FIG. 7 is a diagram illustrating effects of the data transmission system as one example of an embodiment.
Figure 8:
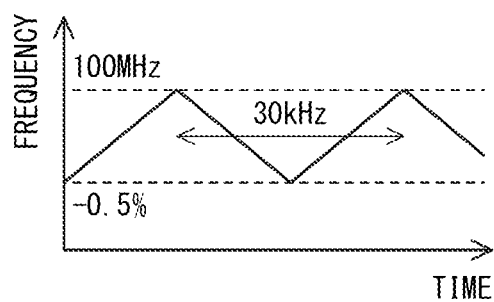
FIG. 8 is a graph illustrating an SSC waveform used in a transmission system.
Figure 9A:
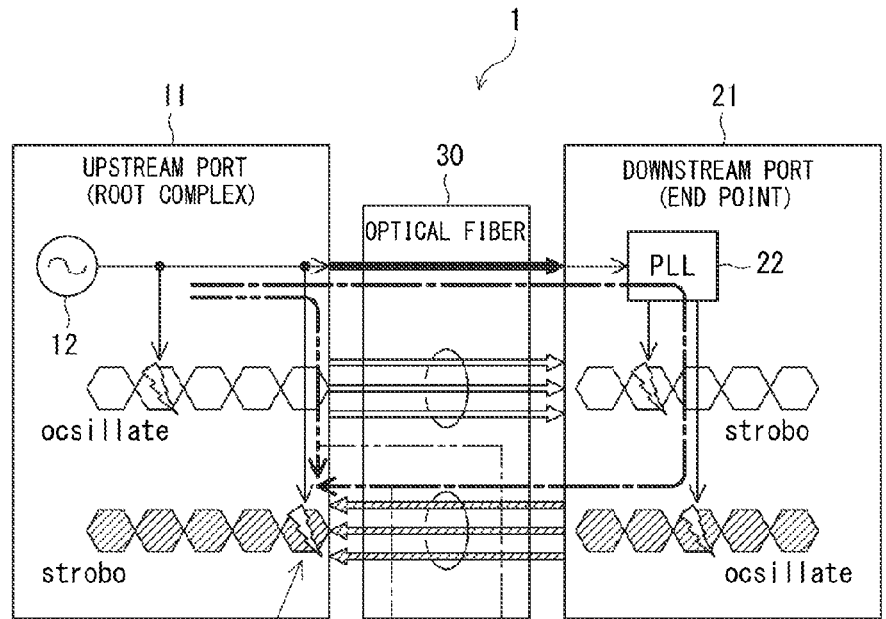
FIG. 9A is a schematic diagram illustrating a configuration of a conventional data transmission system.
Figure 9B:
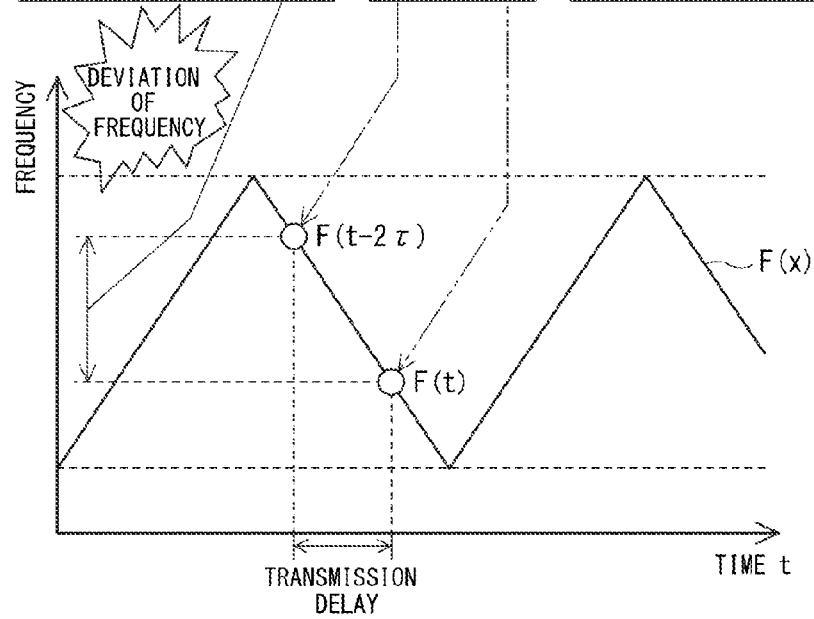
FIG. 9B a graph illustrating an SSC waveform used in the data transmission system in FIG. 9A.

The effects of the data transmission system 100 as one example of an embodiment are illustrated in FIG. 7

Generally, interconnects of about 300 meters are demanded for applications, such as large-scale data centers.

Conventionally, however, transmissions of SSCs have been limited. For example, a long-haul transmission of 100 meters or longer cannot be available with the PCI Express®, and the PCI Express® limits the maximum distance to 7 meters.

In contrast, the data transmission system 100 as an example of the present embodiment can send SSCs beyond the above limit since the frequency is corrected utilizing the transmission delay.

Transmissions in the data transmission system 100 as an example of the present embodiment transmission are now limited to a distance where signal reproduction is hindered by a distortion of the clock waveform caused by jitter. For example, for the optical PCI Express®, the maximum transmission distance is limited around 400 meters.

As described above, since the data transmission system 100 as an example of the present embodiment corrects any deviation of the frequency of SSCs caused by a transmission delay, using the jitter, the requirement for inter-rack transmission distance in a large-scale data center is fulfilled, for example.

(C) Miscellaneous

Note that the present disclosure is not restricted to the embodiments described above, and various modifications may be made without departing from the spirit of the present disclosure.

For example, in an example of an embodiment described above, the frequency correction value calculator 213 determines the transmission distance L from a jitter. Alternatively, the frequency correction value calculator 213 may determine a transmission time from the jitter.

Further, although the SSC information 216 is stored in a memory, such as the storage 212 in an example of an embodiment, the SSC information 216 may be stored in a register (not-illustrated) in the downstream port 201. Alternatively, the SSC information 216 may be received from an outside of the downstream port 201, e.g., from the upstream port 101, via any suitable communication schemes, such as the Inter-Integrated Circuit ($I^2C$).

It is noted that the configurations and operations of the transmission system 100 which have been described may be omitted or may be combined as appropriate if necessary. In other words, the components and functions described above may be appropriately selected or combined together such that the functions of the disclosed technique are achieved.

Further, in an example of an embodiment described above, the order of the steps in the flows may be modified.

In accordance with the disclosed techniques, transmissions of timing signals having periodically varying frequencies are achieved in a longer distance.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An apparatus for correcting a signal, comprising:
a jitter calculator that determines a jitter in a timing signal, the timing signal having a periodically changing frequency and being a spread spectrum clock, the jitter being introduced on communications over a transmission path through which the timing signal is propagated;
a phase calculator that determines a frequency of the spread spectrum clock and a ratio of a change in the frequency of the spread spectrum clock;
a correction value calculator that determines a transmission distance of the transmission path based on the jitter, and determines a transmission delay time from the transmission distance, and a deviation between a frequency of the timing signal and a frequency of received data, as a correction value, from the transmission distance, the correction value calculator determining the correction value, further based on the transmission delay time and a characteristic of the spread spectrum clock; and
a corrector that corrects the frequency of the timing signal by the correction value for synchronizing transmitted data with the timing signal, the correction value calculator determining the correction value, further based on the frequency of the spread spectrum clock and the ratio of a change in the frequency of the spread spectrum clock.

2. A transmission apparatus comprising:

a jitter calculator that determines a jitter in a timing signal, the timing signal having a periodically changing frequency and being a spread spectrum clock, the jitter being introduced on communications over a transmission path through which the timing signal is propagated;

a phase calculator that determines a frequency of the spread spectrum clock and a ratio of a change in the frequency of the spread spectrum clock;

a correction value calculator that determines a transmission distance of the transmission path based on the jitter, and determines a transmission delay time from the transmission distance, and a deviation between a frequency of the timing signal and a frequency of received data, as a correction value, from the transmission distance, the correction value calculator determining the correction value, further based on the transmission delay time and a characteristic of the spread spectrum clock;

a corrector that corrects the frequency of the timing signal by the correction value for synchronizing transmitted data with the timing signal, the correction value calculator determining the correction value, further based on the frequency of the spread spectrum clock and the ratio of a change in the frequency of the spread spectrum clock;

a generator that generates the transmitted data using the timing signal that is corrected by the correction value; and a transmitter that sends the transmitted data to communications over the transmission path.

3. A method of correcting a signal, comprising:

determining a jitter in a timing signal, the timing signal having a periodically changing frequency and being a spread spectrum clock, the jitter being introduced on communications over a transmission path through which the timing signal is propagated;

determining a frequency of the spread spectrum clock and a ratio of a change in the frequency of the spread spectrum clock;

determining a transmission distance of the transmission path based on the jitter;

determining a transmission delay time from the transmission distance;

determining a deviation between a frequency of the timing signal and a frequency of received data, as a correction value, from the transmission distance, further based on the transmission delay time and a characteristic of the spread spectrum clock; and correcting the frequency of the timing signal by the correction value for synchronizing transmitted data with the timing signal, wherein the determining the correction value comprising determining the correction value, further based on the frequency of the spread spectrum clock and the ratio of a change in the frequency of the spread spectrum clock.

4. A transmission system comprising:

a first device;

a second device; and a transmission path connecting the first device and the second device, wherein the first device comprises:

a timing signal generator that generates a timing signal, the timing signal having a periodically changing frequency; and a transmitter that sends the timing signal to the second device, and the second device comprises:

a jitter calculator that determines a jitter in the timing signal, the timing signal being a spread spectrum clock, the jitter being introduced on communications over the transmission path through which the timing signal is propagated;

a phase calculator that determines a frequency of the spread spectrum clock and a ratio of a change in the frequency of the spread spectrum clock;

a correction value calculator that determines a transmission distance of communications over the transmission path based on the jitter, and determines a transmission delay time from the transmission distance, and a deviation between a frequency of the timing signal and a frequency of received data, as a correction value, from the transmission distance, the correction value calculator determining the correction value, further based on the transmission delay time and a characteristic of the spread spectrum clock;

a corrector that corrects the frequency of the timing signal by the correction value for synchronizing transmitted data with the timing signal, the correction value calculator determining the correction value, further based on the frequency of the spread spectrum clock and the ratio of a change in the frequency of the spread spectrum clock;

a data generator that generates the transmitted data using the timing signal that is corrected by the correction value; and a second transmitter that sends the transmitted data to the first device through communications over the transmission path.

\* \* \* \* \*